United States Patent [19]
Seifert et al.

[11] Patent Number: 6,015,087
[45] Date of Patent: Jan. 18, 2000

[54] APPARATUS AND METHOD FOR LEASING DOCUMENTS OF VALUE

[75] Inventors: Dean Alan Seifert, Aurora; Earney Stoutenburg; Paul J. Vogt, both of Highlands Ranch, all of Colo.

[73] Assignee: First Data Corporation, Hackensack, N.J.

[21] Appl. No.: 08/726,133

[22] Filed: Oct. 4, 1996

[51] Int. Cl.[7] ................................................. G06F 15/30
[52] U.S. Cl. .......................... 235/379; 235/380; 902/18
[58] Field of Search .................................. 235/379, 380, 235/385; 902/8, 17, 18, 22

[56] References Cited

U.S. PATENT DOCUMENTS

| | | | |
|---|---|---|---|
| 4,118,022 | 10/1978 | Rayfield et al. | 270/52.5 |
| 4,195,353 | 3/1980 | Abe et al. | 364/900 |
| 4,349,741 | 9/1982 | Bobart et al. | 250/568 |
| 4,385,285 | 5/1983 | Horst et al. | 382/3 |
| 4,432,050 | 2/1984 | Harris et al. | 364/200 |
| 4,459,052 | 7/1984 | Lundblad | 400/124 |
| 4,468,750 | 8/1984 | Chamoff et al. | 364/900 |
| 4,541,334 | 9/1985 | Liedtke et al. | 101/93.18 |
| 4,623,081 | 11/1986 | Hain et al. | 225/105 |
| 4,623,965 | 11/1986 | Wing | 364/408 |

(List continued on next page.)

FOREIGN PATENT DOCUMENTS

| | | |
|---|---|---|
| 2691273 | 11/1993 | France . |
| 2 206 225 | 12/1988 | United Kingdom . |
| WO 92/12479 | 7/1992 | WIPO . |
| WO 93/09506 | 5/1993 | WIPO . |
| WO 94/09580 | 4/1994 | WIPO . |
| WO 95/03570 | 2/1995 | WIPO . |
| WO 95/25320 | 9/1995 | WIPO . |

OTHER PUBLICATIONS

"Best Practices and Technologies for Automated Software Distribution Best Practices Report"; Open Systems Research Group; 14 Pages; Jan. 1, 1995.

"Software Buyers'Guide (Buyers Guide)"; Purchasing, v118, n8, p59(6); may 18, 1995; Dialog File 148, Account No. 07895159.

(List continued on next page.)

*Primary Examiner*—Karl D. Frech
*Attorney, Agent, or Firm*—McCutchen, Doyle, Brown & Enersen LLP

[57] ABSTRACT

Disclosed is an apparatus and method for issuing documents of value such as money orders, gift certificates, utility remittances, phone card, payroll, etc. An apparatus according to the disclosure may include a compartment for receiving substrates on which information associated with a document of value is printed, a code reader which reads codes uniquely associated with each substrate from the substrates, a printer that prints information on the substrates, and a control terminal for controlling the code reader and printer. The control terminal is configured for communication with the code reader and for detection and recordation of the codes uniquely associated with each substrate. The control terminal may detect and record deviations from an expected order of the codes uniquely associated with the substrates upon the substrates being received in the apparatus. An additionally disclosed aspect of the control terminal is as a print access controller permitting physical access to a portion of the printer upon receipt of an access code. A further aspect of the control terminal includes connecting with a system for modification of a portion of the apparatus. A further disclosed aspect of the apparatus is voiding substrates. Additionally disclosed are methods for issuing documents of value. The disclosed methods may include receiving substrates having associated codes, reading the codes; dectecting and recording deviations froman expected order of the codes uniquely associated with the substrates before receiving a request to issue a document of value, receiving a request to issue a document of value, and printing information on a substrate to issue a document of value.

33 Claims, 11 Drawing Sheets

U.S. PATENT DOCUMENTS

| | | |
|---|---|---|
| 4,731,735 | 3/1988 | Borgendale et al. .................... 364/200 |
| 4,745,602 | 5/1988 | Morrell ...................................... 371/20 |
| 4,884,199 | 11/1989 | Boothroyd et al. ..................... 364/408 |
| 4,888,683 | 12/1989 | Koizumi et al. ......................... 364/200 |
| 4,894,784 | 1/1990 | Smith . |
| 4,910,696 | 3/1990 | Grossman et al. ................. 364/705.02 |
| 4,921,279 | 5/1990 | Hanna ....................................... 283/67 |
| 4,928,133 | 5/1990 | Fulton ..................................... 346/150 |
| 4,980,517 | 12/1990 | Kobayashi et al. ....................... 178/18 |
| 4,982,337 | 1/1991 | Burr et al. ............................... 364/479 |
| 4,991,983 | 2/1991 | Graverholt ............................... 400/105 |
| 5,014,212 | 5/1991 | Smith ...................................... 364/479 |
| 5,023,782 | 6/1991 | Lutz et al. ............................... 364/405 |
| 5,119,293 | 6/1992 | Hammond ............................... 364/401 |
| 5,119,294 | 6/1992 | Tanaka .................................... 364/405 |
| 5,128,753 | 7/1992 | Lemelson ................................ 358/101 |
| 5,155,842 | 10/1992 | Rubin ...................................... 395/575 |
| 5,175,766 | 12/1992 | Hamilton ................................... 380/49 |
| 5,245,164 | 9/1993 | Oyama .................................... 235/379 |
| 5,247,623 | 9/1993 | Sun ......................................... 395/325 |
| 5,255,182 | 10/1993 | Adams .................................... 364/405 |
| 5,274,368 | 12/1993 | Breeden et al. .................... 340/825.31 |
| 5,307,265 | 4/1994 | Winans ............................... 364/419.01 |
| 5,337,122 | 8/1994 | Hubble, III et al. ................... 355/208 |
| 5,347,302 | 9/1994 | Simonoff ............................. 346/153.1 |
| 5,348,299 | 9/1994 | Clapper, Jr. ............................. 273/138 |
| 5,369,709 | 11/1994 | Foreman et al. ......................... 380/51 |
| 5,377,271 | 12/1994 | Foreman et al. ......................... 380/51 |
| 5,479,479 | 12/1995 | Braitberg et al. ......................... 379/58 |
| 5,492,423 | 2/1996 | Smith . |
| 5,500,890 | 3/1996 | Rogge et al. ............................. 379/91 |
| 5,526,409 | 6/1996 | Conrow et al. ........................... 379/91 |
| 5,570,960 | 11/1996 | Smith ....................................... 400/74 |
| 5,663,887 | 9/1997 | Warn et al. ........................ 364/479.02 |
| 5,742,845 | 4/1998 | Wagner ................................... 395/831 |
| 5,787,288 | 7/1998 | Nagata et al. ........................... 395/712 |
| 5,790,796 | 8/1998 | Sadowsky .......................... 395/200.51 |

OTHER PUBLICATIONS

"Software Distribution: Cost or Economy?" *Computer Finance*; Feb. 1, 1996; 8 Pages; APT Data Services.

Tanner, Ronald; "A New Dimension in Marketing"; *Computer Usage for Profits*; May, 1987; pp. 133–134, 136.

"Ukrop's Test Data Base Marketing Program; Electronic couponing Tracks Buying Behavior of Valued Customers"; *Chain Store Age Executive*; Sep., 1987; pp. 73–74, 78.

International Search Report; International Application No. PCT/US98/07093 (U.S. Pat. application No. 08/833,849); Sep. 9, 1998.

International Search Report; International Application No PCT/US97/17706 (U.S. Pat. application No. 08/726,133); Apr. 23, 1998.

APPARATUS AND METHOD FOR LEASING DOCUMENTS OF VALUE

FIELD OF THE INVENTION

The present invention relates to dispensers for documents of value and, more particularly, to an automated apparatus and method for issuing negotiable instruments.

BACKGROUND OF THE INVENTION

Negotiable instrument dispensers, such as money order dispensing machines, are well known in the art. Money order dispensing machines ("MODs"), which are also referred to by various names such as "automatic money order dispensers" or "AMODs," or "RMODs" or "Deltas," allow for the issuance and sale of money orders at a wide variety of convenient locations. For example, MODs commonly are placed at convenience stores, check cashing agencies, grocery stores, financial institutions, and other retail and service outlets. The "issuer" of the money orders generally authorizes an "agent" (e.g., the grocery store) to operate the MOD at each location.

When a MOD is installed at a particular site, and periodically thereafter, blank money order forms (which are negotiable documents and are sometimes referred to as "negotiable stock") are loaded into a compartment within the MOD. As customers purchase money orders, the operator enters appropriate information (e.g., amount), and the MOD prints the information on the forms and dispenses the completed money orders. The forms are typically numbered sequentially. When the MOD is loaded, the operator loading the forms enters the serial numbers of the first forms. As money orders are purchased, the MOD increments a counter to keep track of which forms have been printed on. The MODs also provide reports of MOD activity, either electronically or in printed form.

Issuers generally must closely manage their MODs. MODs typically include a number of mechanical components and, therefore, commonly malfunction. Additionally, each MOD contains negotiable documents that may be used to impose financial liabilities on the issuer. To facilitate management of a widespread system of MODs, the MODs should have certain features.

MODs should be user-friendly. The individuals operating the MODs (e.g. clerks at a convenience store) typically have little or no technical training. Moreover, it may be important for a large number of employees of a particular agent, such as a retail store, to operate a particular MOD. It is not practical for an issuer to provide training to each individual who will operate an MOD. Unfortunately, many conventional MODs are not sufficiently easy to use. For example, it is often difficult to properly reload the MODs with negotiable stock. Conventional MODs are also often bulky and difficult to install at agent sites.

MODs should also incorporate security features to prevent unauthorized usage and minimize the risk that counterfeit money orders will be created. Most conventional MODs incorporate relatively primitive and limited security measures. For example, the compartment containing the blank negotiable documents generally is locked, and may be opened only with a physical key. This security measure can prevent some types of unauthorized access, but permits free access to anyone who has obtained the key. It also does not provide any record of who accessed the negotiable documents and what activity took place during such access. Consequently, it is often difficult to determine in a timely manner whether documents have been removed and whether misuse may have occurred.

MODs should also provide a mechanism with which the issuer can monitor usage of the MOD. Most conventional MODs do not provide a mechanism for easy monitoring and rely on information supplied to the issuer or the device itself by the user. For example, conventional MODs generally do not verify the sequence of the items during the sales process, instead relying on the initial number entered by the operator as described above. In the event the documents become out of sequence, the MOD records the expected serial number without verification of the appropriate document on which it is printing.

Some MODs employ a primitive sequence verification technique in which every third document contains an identical, detectable mark (i.e., a sequencing mark). When the MOD detects a sequencing mark, it determines whether the document counter number is divisible by three and, if so, assumes that the documents are in sequence. This technique is inadequate in that it does not detect all types of sequence errors. For example, if three consecutive documents were removed from the sequence, the system would not detect the problem.

Additionally, prior art devices may require the issuer to physically inspect the MOD to obtain many types of information or use techniques such as the sequencing mark, which makes broad assumptions. Conventional MODs also generally require that reconciliation reports be printed on a blank money order form or require the purchase of an additional printer. These reports are either difficult to read, poorly formatted, and require the use of a blank negotiable document, or require an additional hardware purchase.

Accordingly, there is a need for an improved system for issuing negotiable instruments that provides advantages over prior systems.

SUMMARY OF THE INVENTION

The present invention provides an improved system for issuing documents of value. Embodiments of the present invention can provide more convenient, secure and efficient means for issuing negotiable instruments or other documents of value, and for loading, selling and reporting activity relating to negotiable instrument dispensers.

The present invention allows for embodiments having many advantages, including the following:

(i) They allow for an audit trail that accounts for every document placed in the printer.
(ii) They allow for easy loading of the machine and facilitate the determination of what was loaded.
(iii) They are user friendly.
(iv) They provide secure storage of money orders.
(v) They permit reduced manual record keeping and paperwork.
(vi) They provide a daily print out of all transactions.
(vii) They provide quick and efficient printing of money orders.
(viii) They permit the use of standard bar-code, MICR and/or OCR technology.
(ix) They provide an audit trail of who accessed the printer and when.

Many additional advantages of the present invention will become apparent to those skilled in the art based on the present disclosure.

BRIEF DESCRIPTION OF THE DRAWINGS

A complete understanding of the present invention may be gained by considering the following detailed description in conjunction with the accompanying drawing(s), in which.

DESCRIPTION OF PREFERRED EMBODIMENTS

In preferred embodiments of the present invention, an operator uses a control terminal to operate a document dispenser (preferably, a negotiable instrument dispenser) which provides a more convenient, secure, user-friendly, and efficient means for loading, selling and reporting information relating to negotiable documents. The control terminal is connected to a printer/vault housing negotiable stock, signaling to print a money order and to unlock the vault as necessary. Blank money order forms are packaged in predefined bundles with bar code serial numbers (MICR, OCR or other encoding techniques may be used), and are stored in the vault unit of the printer. The control terminal keeps track of which forms have been printed on and other usage information. The activity of the negotiable instrument dispenser is automatically recorded by the control terminal in an electronic "journal" (i.e., in memory) and periodically reported to a central computer.

Figure 1:
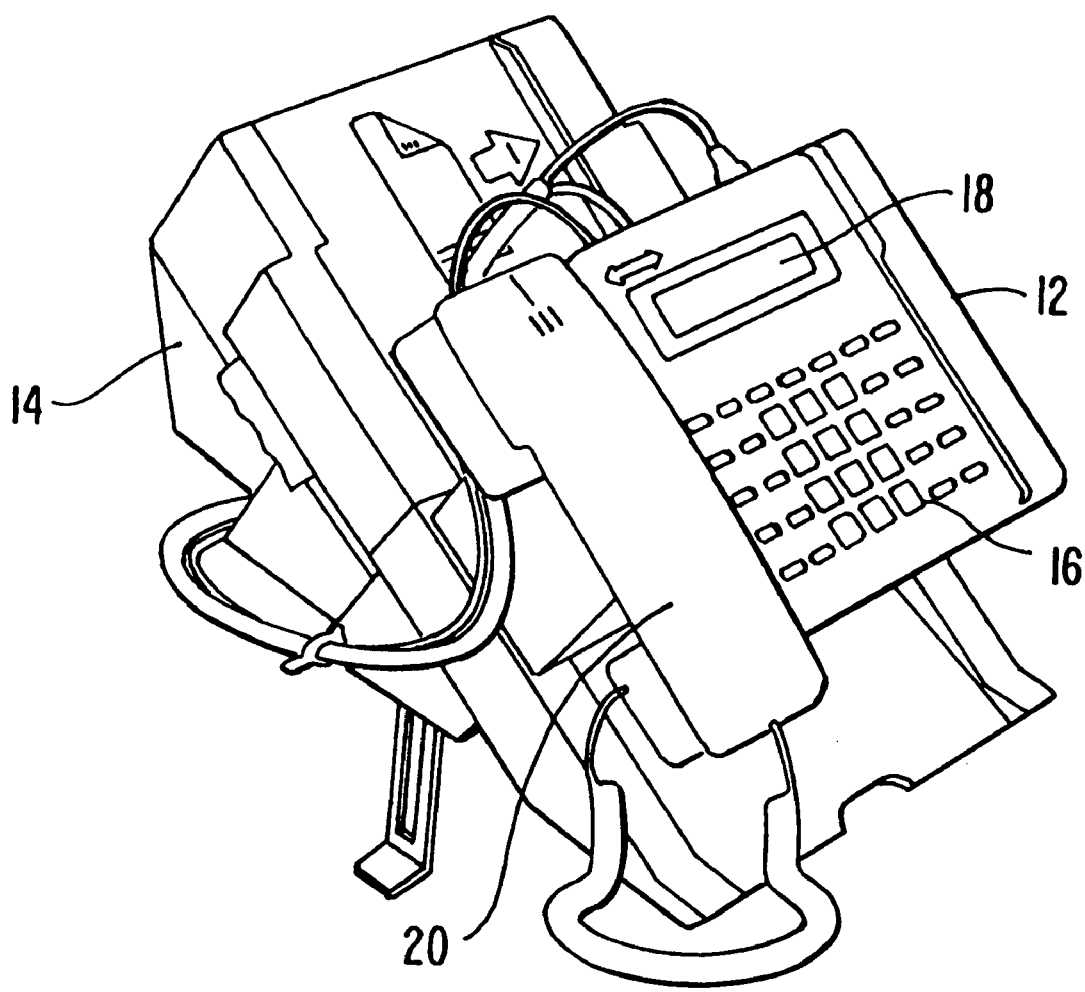
FIG. 1 shows one embodiment of a negotiable instrument dispenser for use according to the present invention.
Figure 2A:
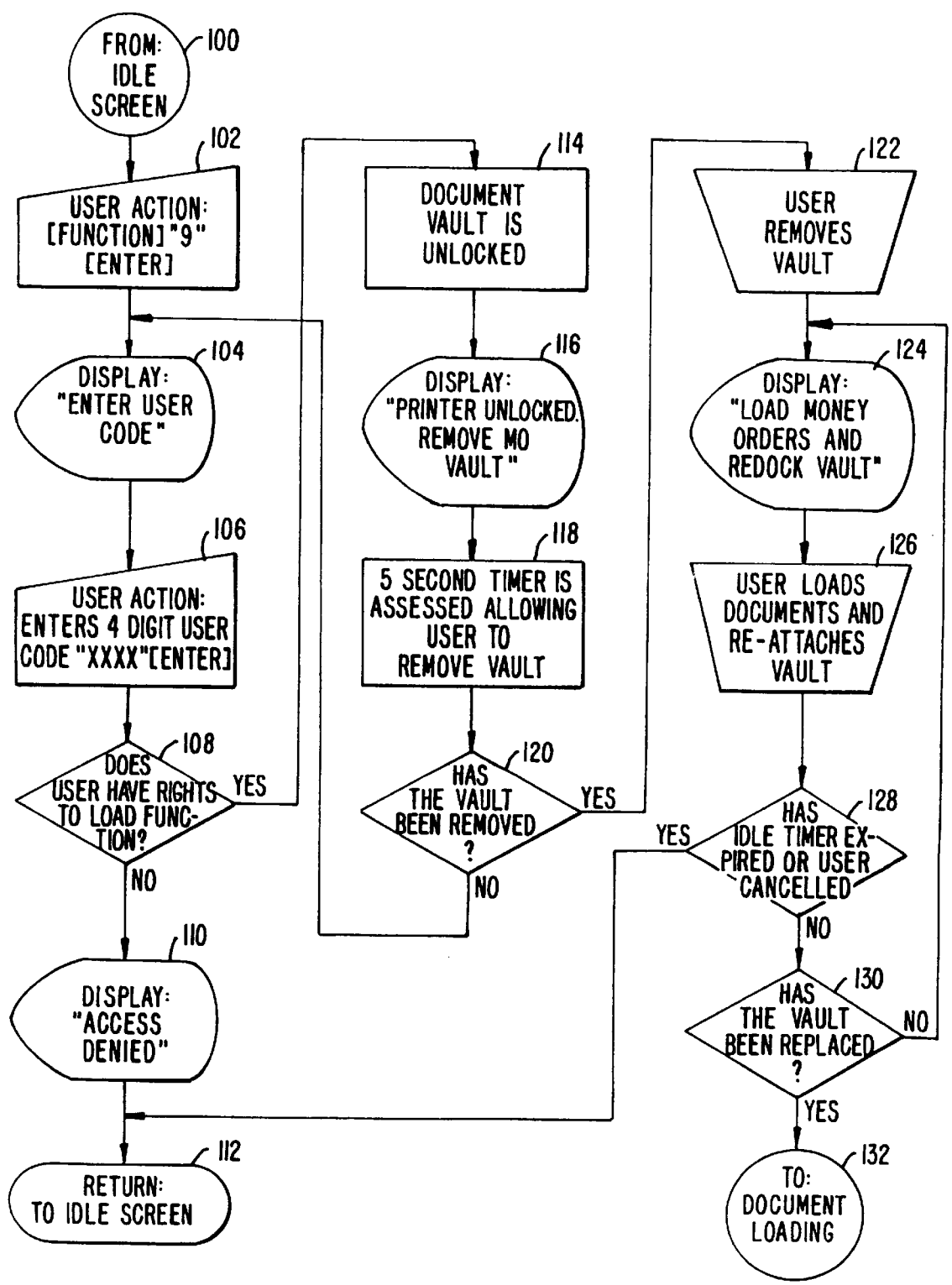
FIGS. 2(a), 2(b), 2(c), and 2(d) are a flow chart illustrating an exemplary document loading process for a negotiable instrument dispenser according to the present invention.
Figure 2B:
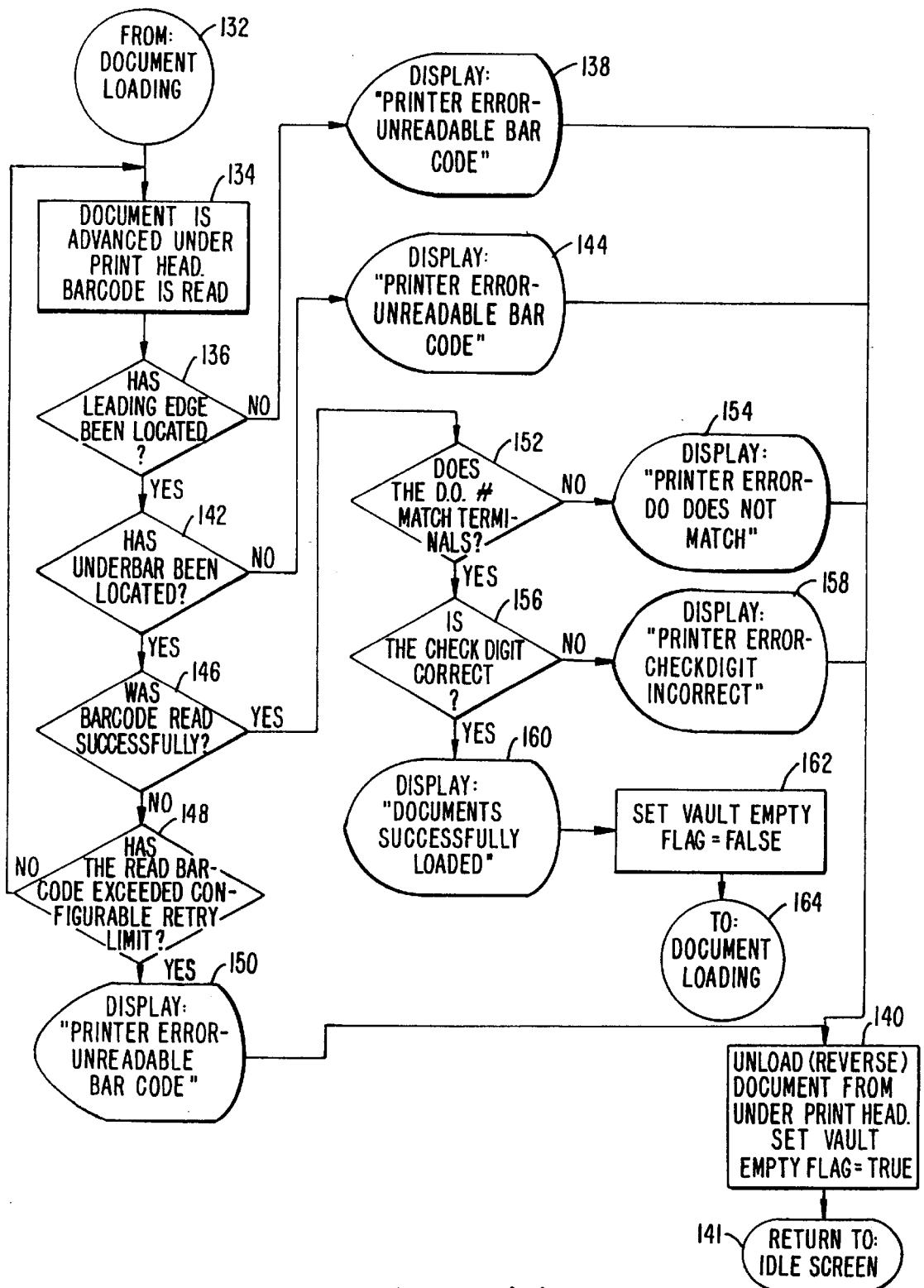
Figure 2C:
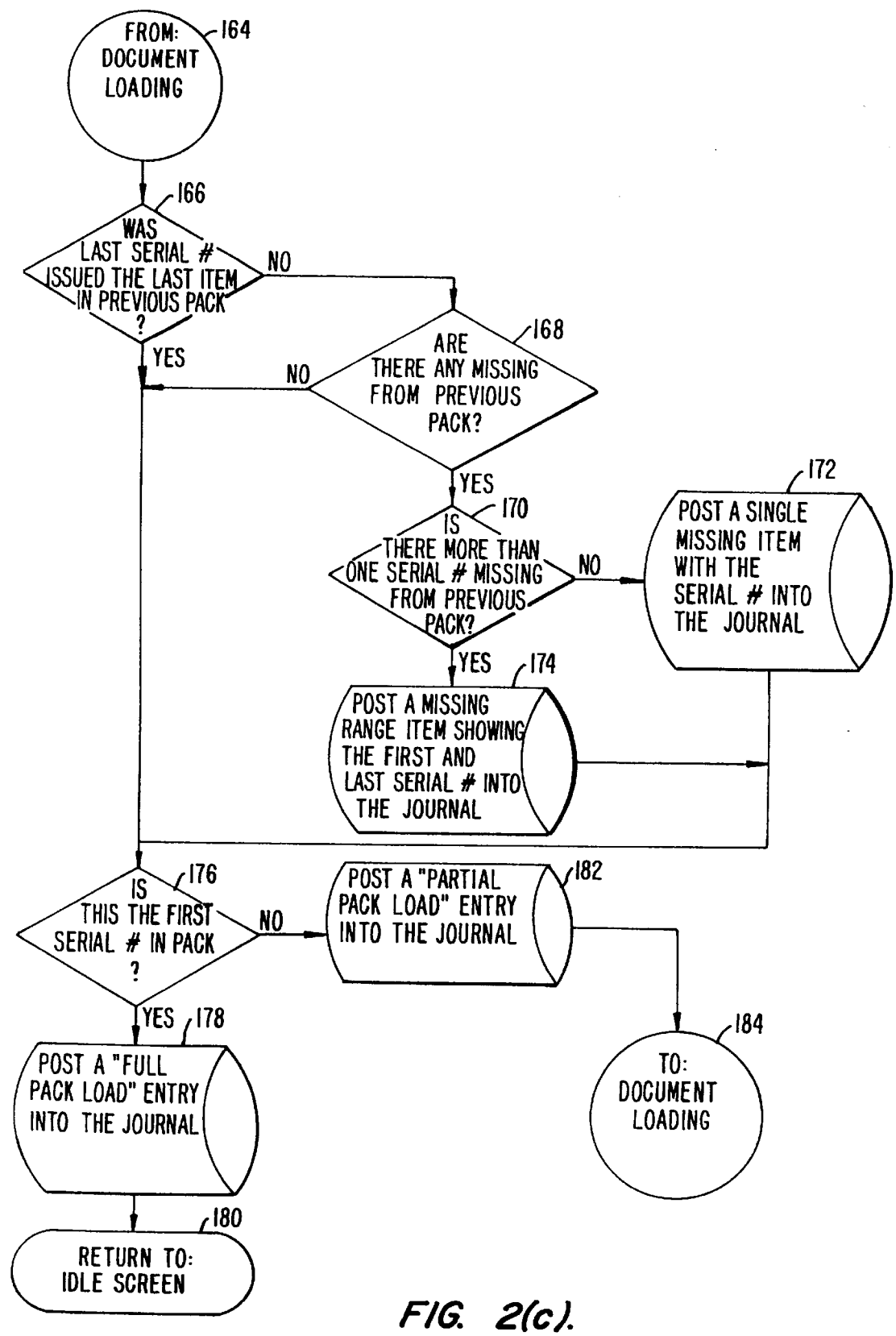
Figure 2D:
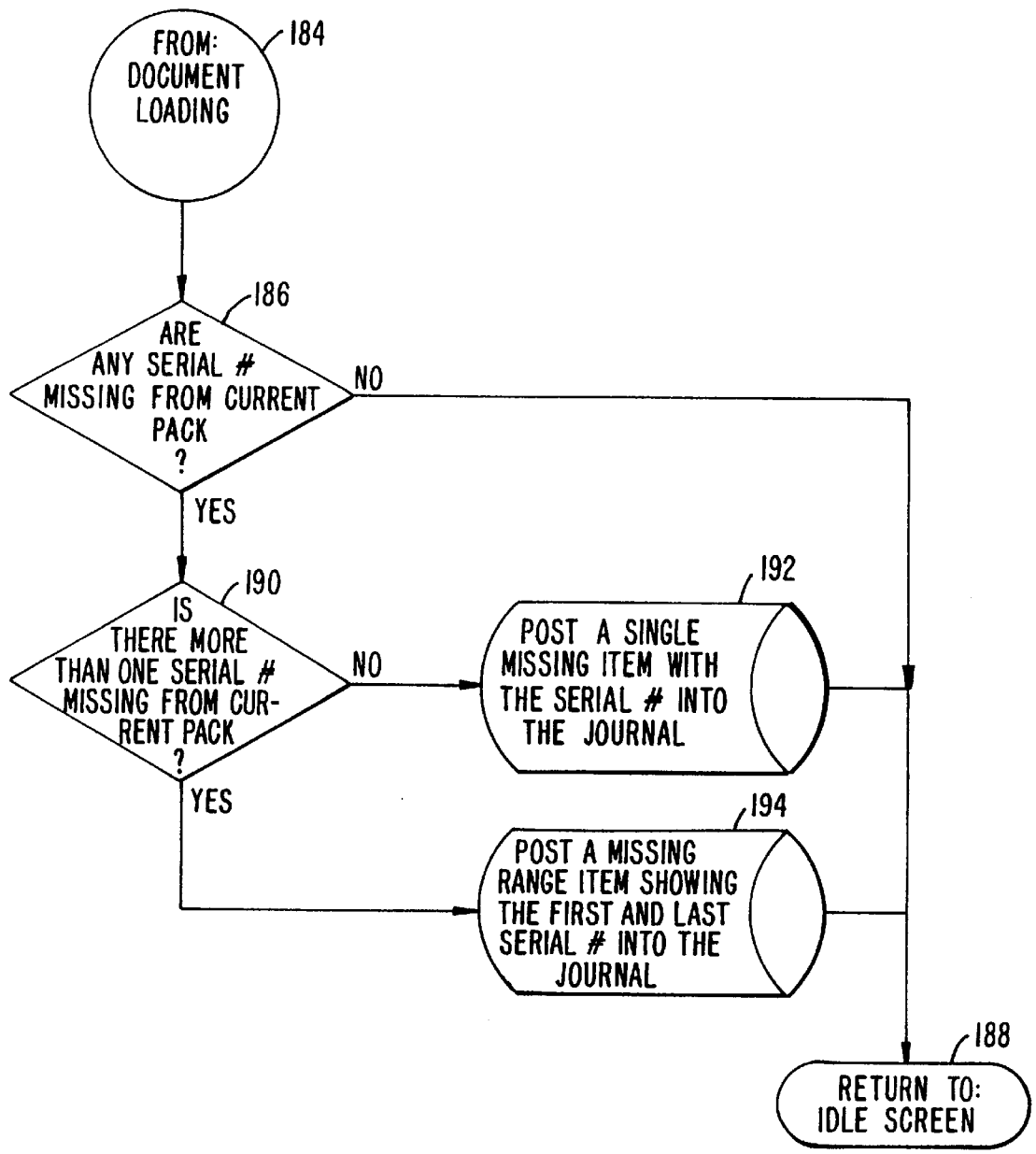
Figure 3A:
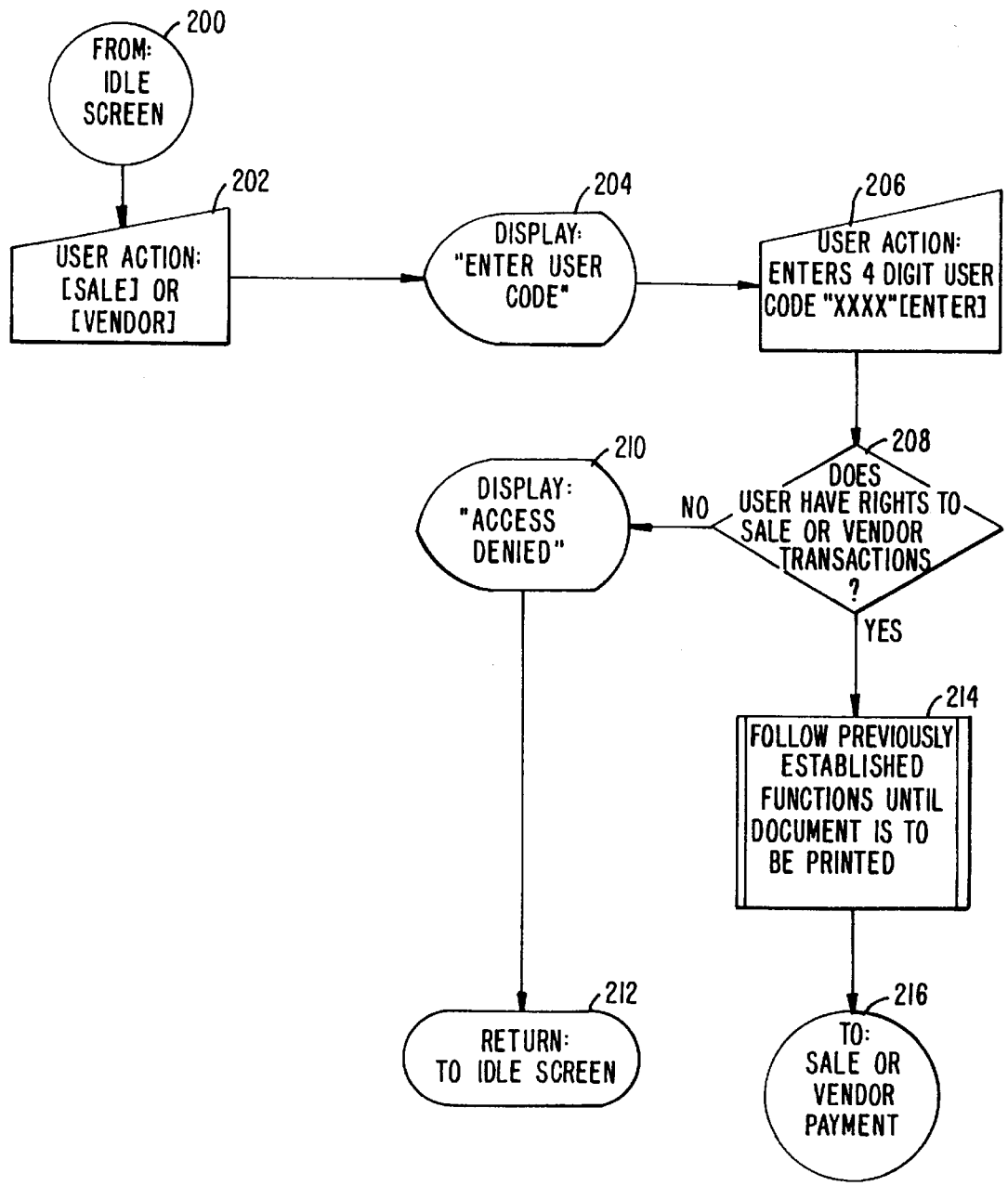
FIGS. 3(a), 3(b), 3(c) and 3(d) are a flow chart illustrating an exemplary process for a sale or vendor payment using a negotiable instrument dispenser according to the present invention.
Figure 3B:
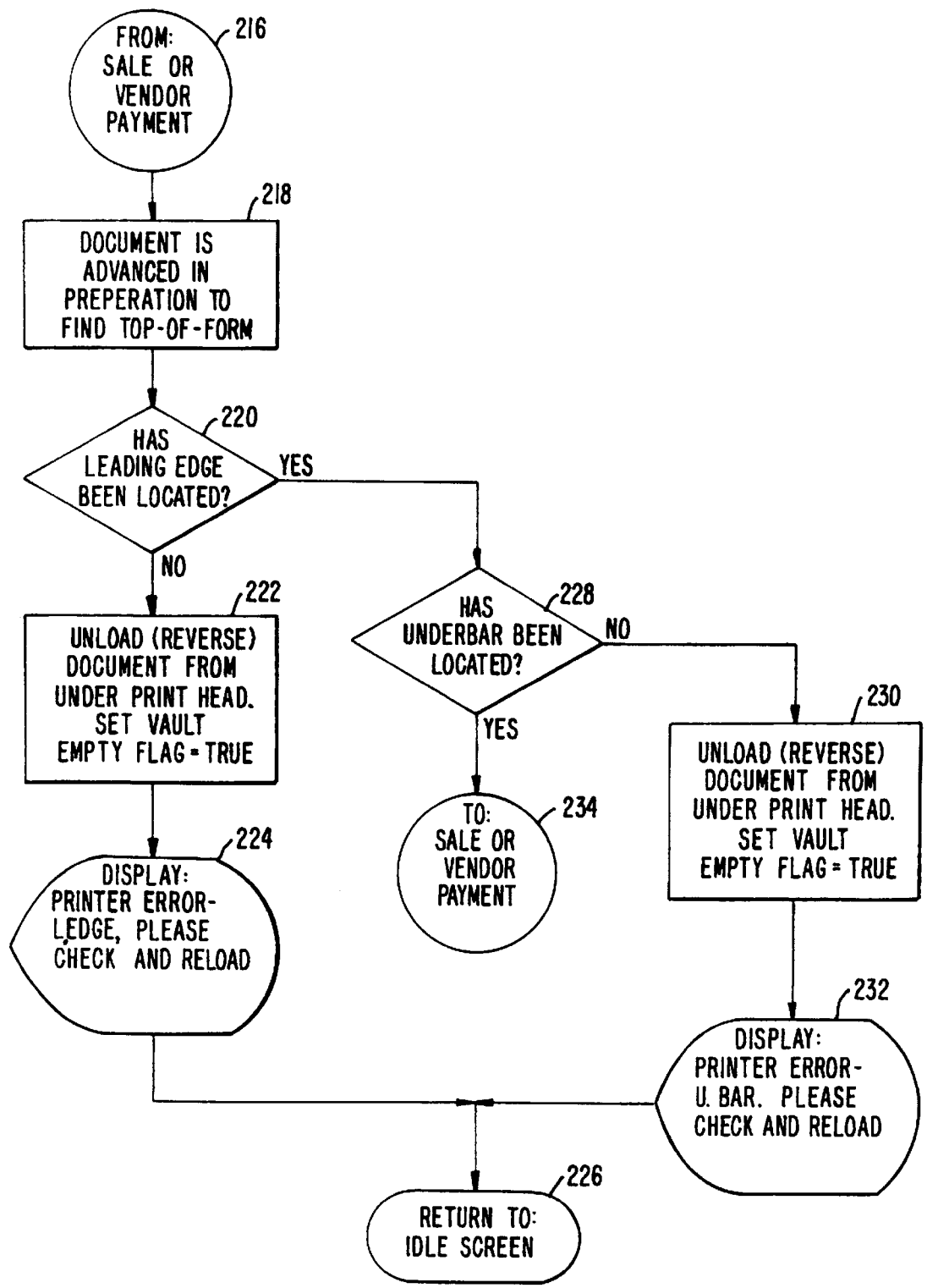
Figure 3C:
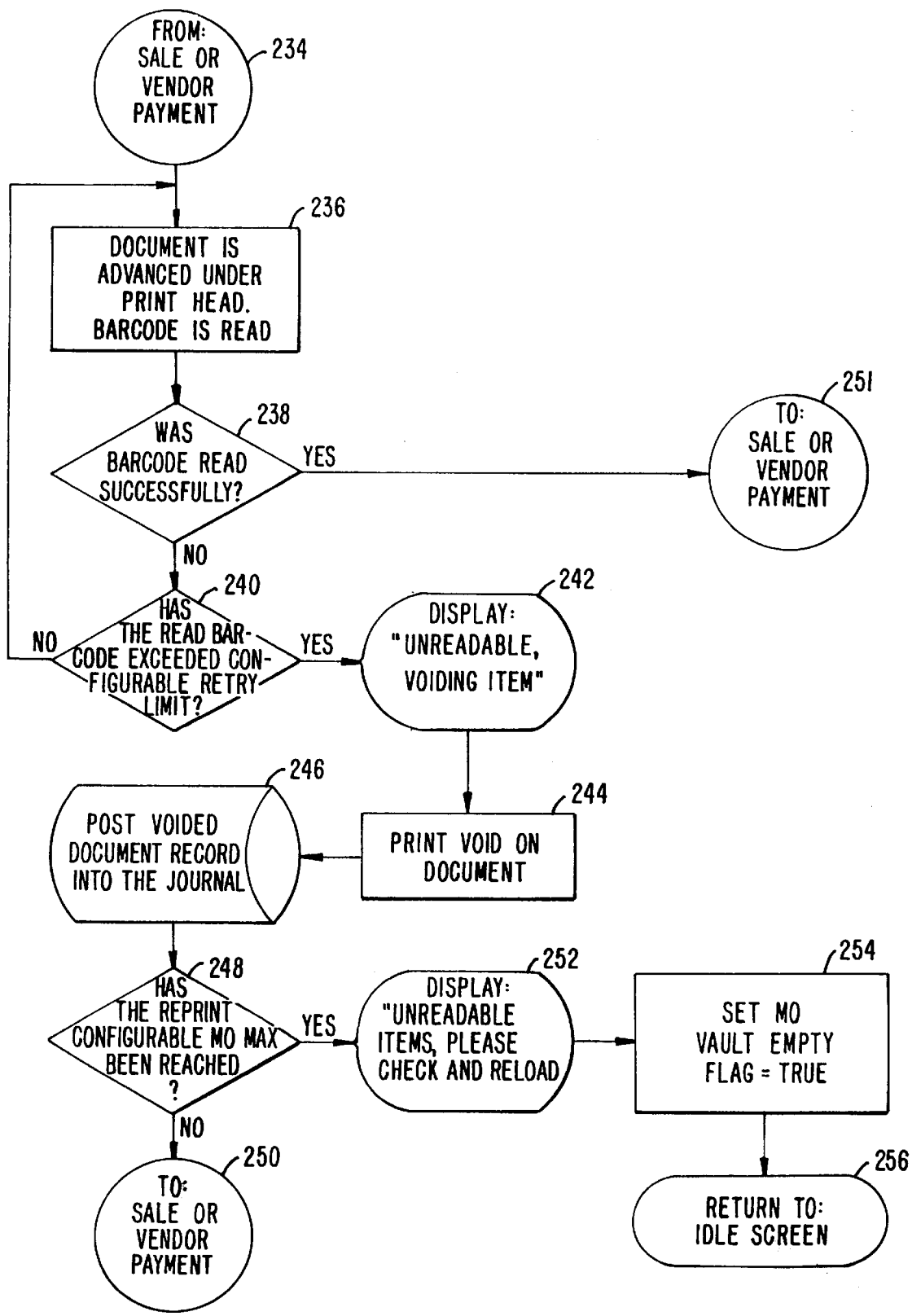
Figure 3D:
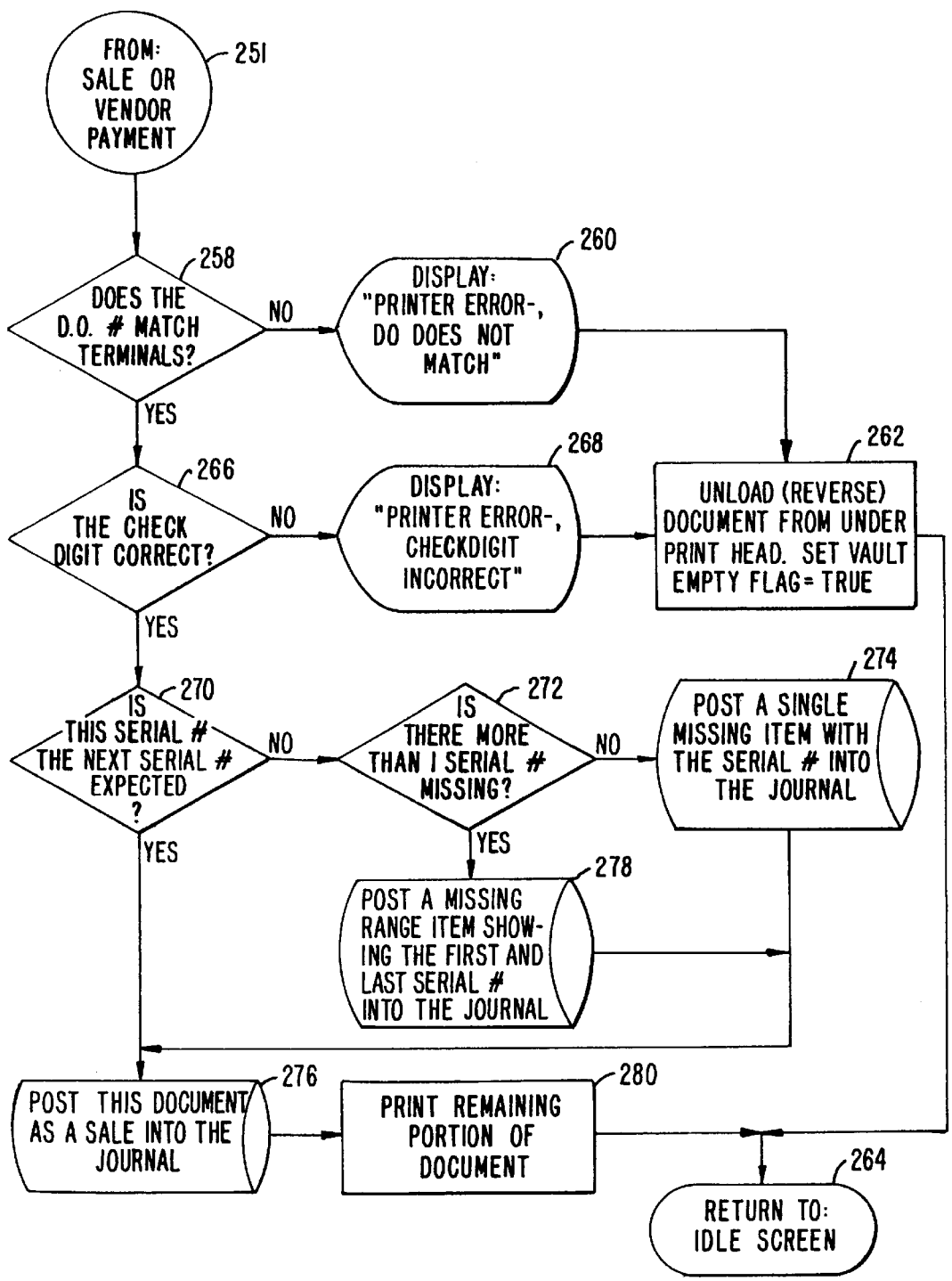

An exemplary automatic money order dispenser ("MOD") 10 for use with the present invention is shown in FIG. 1. MOD 10 consists of two separate parts: a control terminal 12 and printer/vault 14. Installation at an agent/user site simply involves connecting these two parts together, and then connecting them to a telephone line to permit data transfer, and to an electrical outlet for power.

Control terminal 12 has three main functions: (1) to communicate with the issuer's central computer (i.e., the host system); (2) to control printer/vault 14 in accordance with pre-defined rules and user instructions; and (3) to control all other system activity. From the standpoint of a user, it consists of a keypad 16, a display 18, and an optional telephone handset 20. MOD 10 uses ordinary phone lines to transmit activity to the central computer for quick and efficient record keeping. Control terminal 12 also records in its memory a "journal" or activity log, which keeps track of its usage information as described further herein.

Control terminal 12 keeps track of all transactions until it automatically "uploads" that information to the host computer at the issuer's central control facility at the end of each business day or at various times throughout the day. The transaction information preferably is stored in an internal nonvolatile memory (which may be implemented by either a volatile memory with a battery backup or a conventional nonvolatile memory). The control terminal also includes conventional programmable processor hardware so that it can be programmed to perform the processes described herein.

An operator uses keypad 16 on control terminal 12 to initiate any transactions with MOD 10. The steps that must be performed for each transaction are relatively simple. Instructions on performing all transactions preferably are described in a user guide provided to the agent.

The operator enters commands by pressing keys on keypad 16. Preferably, keypad 16 has three types of keys:

(1) Function Keys. These keys are used to initiate the type of transaction desired (e.g., sales, void, report, cancel).

(2) Numeric Keys. "0" through "9" are numeric keys. A user presses these when he needs to enter an amount or code.

(3) Alphanumeric Keys. These keys are used in vendor payment transactions. Keypad 16 can be implemented by those skilled in the art using any conventional keypad technology, including for example softkeys.

Display 18 provides users with important information and prompts users through the steps of each procedure. Display 18 can be implemented by those skilled in the art using alphanumeric display technology.

Display 18 is usually at the "status screen." This is the starting point of all functions available on the terminal. If the display screen shows a different message before a user begins a transaction, or a user becomes confused midway through a transaction, he or she simply presses "CANCEL" to return to this status screen. The status screen displays the current date and time, along with the number of documents in the printer and the number of transactions in the current day's files for various products applications in same terminal (e.g., money orders, utility remittance, phone card, payroll and gift certificates).

Printer/vault 14 preferably comprises a printer portion that contains a conventional MOD printer and a vault portion locked to the printer portion. The blank money order forms are stored in the vault portion of printer/vault 14. Printer/vault 14 is activated by control terminal 12. Based on commands input by the operator, money orders are automatically imprinted with the amount specified through control terminal 12 and dispensed to the operator. Printer 14 preferably contains a bar code reader, and the blank money order forms preferably are coded with bar code serial numbers. MICR technology may also be used for this purpose in a conventional manner. It will be apparent based on the present disclosure that any conventional OCR technology will also suffice.

1. Loading Procedure

In order to permit the system to determine whether a blank document is at the beginning, middle or end of a pack or bundle, the blank documents are prepackaged in sets of a predetermined size (e.g., 400 documents) and given serial numbers commencing with a multiple of the pack size (e.g., 400, 800, 1200, etc.) The remaining documents are in serial order (e.g., 400–799 in one packet). The system can therefore easily determine the location of a particular document within a pack and how many documents remain in the pack.

Printer/vault 14 of MOD 10 is loaded with negotiable stock at the agent/user site. During loading, the terminal requests a security code. The user inputs a security code using control terminal 12, and the security code is verified to have access rights for the load function. If the current user has rights to the load function, control terminal 12 sends a signal to the printer/vault 14 to unlock the vault (preferably using a solenoid or conventional electro-mechanical lock)

from the printer unit, allowing the user to remove the vault. Display 18 prompts the user to remove the vault. If the user fails to remove the vault within a pre-defined time, the printer unit will re-lock the vault. Access to the vault will not be granted without the re-entry of an authorized access code.

After the vault is removed from the printer unit, the user can load a pack of negotiable documents into the vault and re-attach the vault to the printer. After the vault is re-attached to the printer unit, control terminal 12 signals the printer to load the first form and perform a bar-code read on the pre-printed bar code on the form. The pre-printed bar code preferably comprises numeric and/or alpha characters. Upon reading the pre-printed bar code, the printer returns the numeric (or alpha, or alphanumeric) value to control terminal 12. Control terminal 12 determines whether the returned numeric value is appropriate and responds appropriately.

More explicitly, the steps are as follows. After control terminal 12 signals the printer to load a form and read the pre-printed bar code, the printer begins to load a form. If the leading edge of a document is not recognized, the printer will respond to control terminal 12 that no documents have been recognized. Control terminal 12 displays an error message that no documents were detected and requests the user to reload the forms.

When the leading edge of a document is recognized, the printer attempts to detect an under bar which indicates the position of the pre-printed bar code. If the under bar is not detected within a predetermined number of steps, the printer returns a message to control terminal 12 indicating that the under bar was not detected. The terminal displays an error message that there was a loading error and requests that the user reload the forms. In this manner, the terminal can detect whether the documents were loaded upside-down or backwards. Control terminal 12 signals the printer to return the form to the vault.

Once the under bar is detected, the printer attempts to read the pre-printed bar code on the form. If the bar code is read successfully, the printer returns the appropriate values to the terminal. The terminal calculates the number of items remaining in the pack, determines whether this load was of a full or partial pack; and verifies that the value is in the proper format. The terminal also verifies that the value passes all appropriate check digit verifications, displays a successful load message to the user, signals the printer to return the form to the vault, and makes appropriate entries in the journal (e.g., who opened the printer; time; whether a full pack or partial pack was loaded).

Whenever a document is read, control terminal 12 compares the current serial number to the expected serial number. If the current serial number is different than the expected serial number, the terminal determines if the current serial number is in the same pack as the expected serial number. If the current serial number is in the same pack as the expected serial number, the terminal records a missing serial number or range of serial numbers in its internal memory to indicate that items are missing from the pack. If the current serial number is not in the same pack as the expected serial number, the terminal records a missing range from the expected serial number to the end of the pack. The terminal then determines if there are missing items from the pack from the current serial number. If items are missing from the new pack to the current serial number, the terminal records a missing range of serial numbers from the beginning of the new pack to the current serial number.

The terminal also determines if the current serial number is the beginning of a pack, or if it is an item from the middle of a pack or if that serial number is already recorded in the journal. If the current item is the beginning of a new pack, the terminal records that a full pack has been loaded. If the current item is in the middle of a pack, the terminal records a partial pack has been loaded. If the serial number was previously recorded in the journal, the document is voided by printing "void" on the document. Again, this activity is entered into the journal.

The procedure for loading documents is described in more detail herein in connection with FIGS. 2(*a*)–2(*d*).

2. Issuance

During the issuance of negotiable documents, control terminal 12 signals printer 14 to load a form. Printer 14 begins to load a form. If the leading edge of a document is not recognized within a predetermined number of steps within the printer, the printer responds to the terminal that no documents have been recognized. The terminal displays an error message that no documents were detected and requests that the user load new forms or reload the current set of forms. The terminal signals the printer to unload the form and return it to the vault.

Once the leading edge is recognized, the printer attempts to detect an under bar which indicates the position of the pre-printed bar code. If the under bar is not detected within a predetermined number of steps, the printer returns a message indicating to the terminal that the under bar was not detected. The terminal displays an error message that the under bar was not detected on the form and requests that the user reload the forms. The terminal signals the printer to return the form to the vault.

Once the under bar is detected, the printer advances a predetermined number of steps and attempts to read the pre-printed bar code on the form. If the bar code is read successfully, the printer returns the appropriate value to the terminal. The terminal verifies that the value is in the proper format and verifies that the value passes all appropriate check digit verifications. The terminal compares the current serial number to the expected serial number. If the current serial number is different than the expected serial number, the terminal determines whether the current serial number is in the same pack as the expected serial number. If the current serial number is in the same pack as the expected serial number, the terminal records a missing range from the expected serial number to the end of the pack. The terminal then determines if there are missing items from the pack from the current serial number. If items are missing from the new pack to the current serial number, the terminal records a missing range of serial numbers from the beginning of the new pack to the current serial number.

If the bar code is not successfully read within a predetermined number of retries, the printer returns an error message to the terminal indicating that the value could not be ascertained from the pre-printed bar code. The terminal displays an error message that the bar code is unreadable, then signals the printer to print void on the remainder of the item and records the expected serial number as a void. The terminal then signals the printer to load the next form and attempt the sale. This process continues until a readable form is recognized in the printer or until a pre-configured number of items has been voided due to unreadability.

When a readable form is recognized, control terminal 12 instructs the printer to print designated data on the document and make the appropriate journal entry. The MOD then dispenses the documents.

The procedure for issuing negotiable documents is described further herein in connection with FIGS. 3(*a*)–3(*d*).

3. Other Features

The control terminal records a list of security codes and their associated rights in a memory. The control terminal allows a user to define each security profile with a unique set of configurable rights, increasing the flexibility of the security of the device. For example, certain operators may be allowed to perform all possible functions and others may be allowed to perform only a few functions, such as sales and voids.

In the case of a vendor payment, the money order is used to pay a vendor of the agent. This option is made available to some agents to permit them to allow employees to pay vendors without the need to maintain large amounts of cash on the premises. If an agent has been granted the optional vendor payment capability, the operator can, in many systems, enter any vendor name using the alphanumeric keypad. In other systems, the operator may be limited to selecting from a predetermined list of vendors. In such a system, a plurality of vendor names may be stored in the memory within the terminal for printing on the payee line of the negotiable documents.

Memory within control terminal 12 records a list of fees associated with ranges of dollar values. The user can configure the terminal to calculate a fee based on the amount requested or a percentage of the face amount. The terminal records four different ranges of values associated with a fee.

The reading of a specific pre-printed bar code for each item ensures the proper transaction posting of each sale item The missing item detection allows for a solid, traceable audit trail.

As described herein, the present invention utilizes software to unlock and lock the vault based on a pre-defined set of rules. For example, the vault may only be unlocked upon entry of an appropriate security code. The software monitors and relocks the vault if it has not been opened for a predetermined period of time. This software lock/unlock feature also helps to provide a traceable audit trail with respect to printer access. The flexible, completely configurable security parameters allow the user to define which rights are accessible by employees.

Software determines any break in sequence of the documents, registering these breaks as missing items. This is printed on all reports, which serves as an early warning notice for possible fraud.

The security code which allows access to sensitive areas of the application is dynamic. It changes daily based on a predetermined algorithm. The algorithm may be a function of the date, and/or a predetermined identification code. This prevents an agent from learning the code on one day while troubleshooting and re-using it at a later date.

Procedure for document loading with bar code logic is now described in connection with FIG. 2(a), FIG. 2(b), FIG. 2(c) and FIG. 2(d).

Initially, the system is in an idle mode, displaying the "status" or idle screen as shown in Step 100. In Step 102, the user enters a code (for example, function "9") to indicate that he or she wishes to load documents into the printer/vault. The system then displays "Enter User Code" in Step 104 and the user enters a user access code (single character or multi-character) in Step 106. In Step 108, the system determines whether the user has the rights to load documents (not all users will have such a right). If the user does not have such rights, the system will display "Access Denied" as shown in Step 110 and will return to the idle screen in Step 112. If, in Step 108, the system determines based on the access code that the user has the right to load documents, the document vault is unlocked in Step 114, and the system displays "Printer Unlocked, Remove M.O. Vault" in Step 116. The system also makes appropriate journal entries.

After displaying this message, a configurable timer is set (preferably five seconds), allowing the user to remove the vault, as indicated in Step 118. In Step 120, the system senses whether the vault has been removed during the predetermined time period. If not, the vault is re-locked to the printer, the system returns to Step 104, indicating in its display that the user should re-enter his or her user's code and try again. If the user removes the vault as shown in Step 122, the system displays "Load Money Orders and Replace Vault" in Step 124. In Step 126, the user loads documents and reattaches the vault. The system then checks in Steps 128 to determine whether an idle timer has expired or the user has pressed cancel. If so, the system returns to an idle screen. If not, the system determines whether the vault has been replaced and, if not, returns to Step 124 indicating on its display that the user should load money orders. If the vault has been replaced in Step 130, the system moves on through Node 132 (shown for convenience in both FIG. 2(a) and FIG. 2(b)) to Step 134.

In Step 134, the document is advanced under the print head and the bar code is read. If, in Step 136, the leading edge of the document has not been located, the system will display "Printer Error-Unreadable Bar Code" in Step 138, return the document to the vault in Step 140 (setting a vault empty flag), and return to the idle screen in Step 141.

If the leading edge of a document has been detected in Step 136, the system will determine in Step 142 whether the bar code underbar has been located and, if not, will display "Printer Error—Unreadable Bar Code" (or "U-Bar Undetected") in Step 144, thereafter moving on to Steps 140 and 141 as previously described. This detects documents that have been incorrectly positioned in the printer/vault (i.e., placed upside down or backwards).

If the underbar has been located in Step 142, the system will determine in Step 146 whether the bar code was successfully read. If not, the system will determine whether the bar code exceeded a configurable and predetermined retry limit in Step 148 and, if not, will return to Step 134. If so, the system will display "Printer Error—Unreadable Bar Code" in Step 150 and move on to Steps 140 and 141 as previously described.

If, in Step 146, the system determines that the bar code was read successfully, the system will check in Step 152 to determine whether the D.O. number matches a predetermined number. (The D.O. number is the first two numbers of the document serial number.) If not, the system in Step 154 will display "Printer Error—D.O. Does Not Match" and move on to Steps 140 and 141 as previously described. If the D.O. number does match the predetermined number in Step 152, the system will check in 156 to determine whether the check digit is correct and, if not, the system will display in Step 158 "Printer Error—Check Digit Incorrect" and move on to Steps 140 and 141 as previously described.

If the check digit in Step 156 is correct, the system will display "Documents Successfully Loaded" in Step 160, make sure that the vault flag is not set to empty in Step 162 and move on through Node 164 to Step 166.

In Step 166, the system determines whether the serial number of the document which last issued as a money order was the last item in the previous pack of documents. If so, the system determines in Step 176 whether the new document (i.e., the document just read after loading) is the first serial number in a pack. If so the system posts a "Full Pack Load" entry into its memory (also referred to as a journal) in Step 178 and returns to the idle screen in Step 180. If the current document is not the first serial number in a pack, the system posts a "Partial Pack Load" entry into the journal in Step 182 and moves on through Node 184 to Step 186.

If, in Step 166, the system determines that the last issued document was not the last item in the previous pack, the system checks its memory in Step 168 to determine whether there were any items missing from the previous pack and, if not, moves on to Step 176 previously described. If there were items missing from the previous pack, the system checks in Step 170 to determine whether there is more than one serial number missing from the previous pack. If not, the system posts in Step 172 a single missing item and moves on to Step 176 as previously described. If there is more than one serial number missing from the previous pack, the system posts, in Step 174, a missing range item showing the first and last serial numbers. After posting the missing range in Step 174, the system moves on to Step 176 as previously described. This missing range information is printed on all reports and can be transmitted to the host.

In Step 186, the system determines whether there are any serial numbers missing from the current pack. If not, the system returns to an idle screen in Step 188. If so, the system checks in Step 190 to determine whether there are more than one serial number missing from the current pack. If not, the system posts in Step 192 a single missing item with the serial number and moves on to Step 188 as previously described. If there is more than one serial number missing from the current pack, the system posts in Step 194 a missing range item showing the first and last serial number and moves on to Step 188 as previously described.

The sale or vendor payment with bar code logic is now described in connection with FIG. 3(a), FIG. 3(b), FIG. 3(c) and FIG. 3(d).

In Step 200, the system displays an idle screen. In Step 202, the user presses a function key indicating a "sale" or "vendor payment." In Step 204, the system displays "Enter User Code" and, in response, in Step 206, the user enters his or her user code. In Step 208, the system checks to determine whether the user has rights to perform a sale or vendor transaction and, if not, displays "Access Denied" in Step 210. The system subsequently returns to an idle screen in Step 212.

If, in Step 208, the system determines that the user does have a right to conduct a sale or vendor transaction, the system and user follow previously established functions to obtain information necessary to conduct the sale or vendor transaction, these procedures being performed in Step 214, after which the system moves through Node 216 to Step 218. In Step 218, a document is advanced to the printer. The system checks in Step 220 to determine whether the leading edge has been located. If not, in Step 222, the system unloads the document from under the print head and sets the vault empty flag, thereafter displaying in Step 224 "Printer Error—L. Edge, Please Check and Reload" and subsequently returns to the idle screen, Step 226. If the leading edge for the document is located in Step 220, the system checks in Step 228 to determine whether the underbar is located and, if not, unloads the document from under the print head in Step 230 and sets the vault empty flag. In Step 232, the system then displays "Printer Error—U. Bar, Please Check and Reload", and subsequently moves to Step 226 as previously described.

If, in Step 228, an underbar has been located, the system moves through Node 234 to Step 236.

In Step 236, the document is advanced under the print head and the bar code is read. If the system determines in Step 238 that the bar code was not read successfully, the system checks in Step 240 to determine whether the bar code exceeded configurable retry limit. If not, the system returns to Step 236. If so, the system displays in Step 242 "Unreadable, Voiding Item," prints "Void" on the document in Step 244, posts the voided document to a record in its memory (i.e., journal) in Step 246 and checks to determine whether a predetermined maximum number of unsuccessful reads has occurred in Step 248. If not, the system moves through Node 215 and 216 to Step 218. If so, the system displays in Step 252 "Unreadable Items, Please Check and Reload" or "Unreadable Items—Please Call the Help Desk" and in Step 254 sets MO vault empty flag, thereafter returning to the idle screen in Step 256.

If the bar code was read successfully in Step 238, the system moves through Node 251 to Step 258.

In Step 258, the system determines whether the D.O. number matches the predetermined value in the terminal. If not, the system displays in Step 260 "Printer Error—D.O. Does Not Match", unloads the document from under the print head and sets the vault empty flag in Step 262 and returns to the idle screen in Step 264. If the D.O. number does match the terminals in Step 258, the system determines in Step 266 whether the digit is correct and, if not, displays "Printer Error—Check Digit Incorrect" in Step 268 and moves on through Step 262 as previously described.

If the check digit is correct, the system determines in Step 270 whether the serial number is the next serial number expected and, if so, posts this document as a sale into the journal in Step 276, prints the remaining portion of the document in Step 280, and returns to the idle screen in Step 264.

If, in Step 270, the system determines that the serial number is not the next serial number expected, the system checks to see whether more than one serial number is missing in Step 272 and, if not, posts a single missing item with the serial number into the journal in Step 274 and moves on to Step 276 as previously described. If there is more than one serial number missing in Step 272, the system posts a missing range of items showing the first and last serial number into the journal in Step 278 and moves on to Step 276 as previously described.

Figure 4:
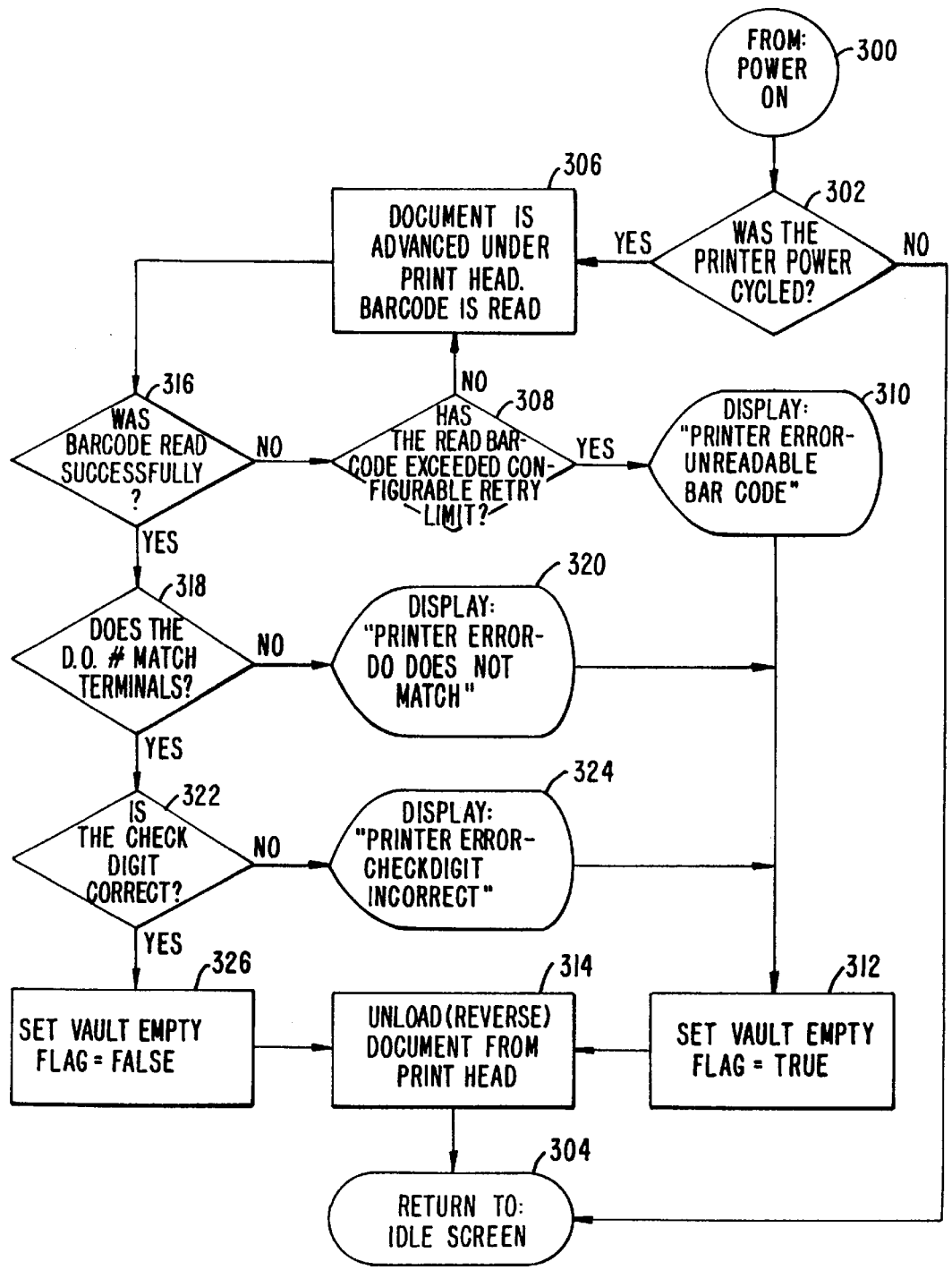
FIG. 4 is a flow chart showing an exemplary power cycle of a negotiable instrument dispenser according to the present invention.

The power cycle with bar code logic is now described in connection with FIG. 4.

In Step 300, the system is turned on. In Step 302, the system determines whether the printer power was cycled and, if not, returns to an idle screen in Step 304. If the printer power was cycled, a document is advanced under the print head in Step 306 and bar code is read. If the bar code is read successfully in Step 316, the system checks to determine whether the D.O. number matches the terminal's number in Step 318 and, if so, determines whether the check digit is correct in Step 322. If the check digit is correct, the system unsets the vault empty flag in Step 326, removes the document from under the print head (and optionally checks for missing items) in Step 314, and returns to the idle screen, making appropriate journal entries.

If the bar code was not read successfully in Step 316, the system checks in Step 308 to determine whether the bar code has exceeded the configurable retry limit and, if not, returns to Step 306. If so, the system displays in Step 310 "Printer Error—Unreadable Bar Code", sets the vault empty flag in Step 312, unloads the document from under the print head in Step 314, and returns to the idle screen in Step 304.

If, in Step 318, the D.O. number does not match the terminal's, the system displays in Step 320 "Printer Error—D.O. Does Not Match" and moves on to Step 312 as previously described.

If, in Step 322, the check digit is not correct, the system displays in Step 324 "Printer Error—Check Digit Incorrect" and moves on to Step 312 as previously described.

Figure 5:
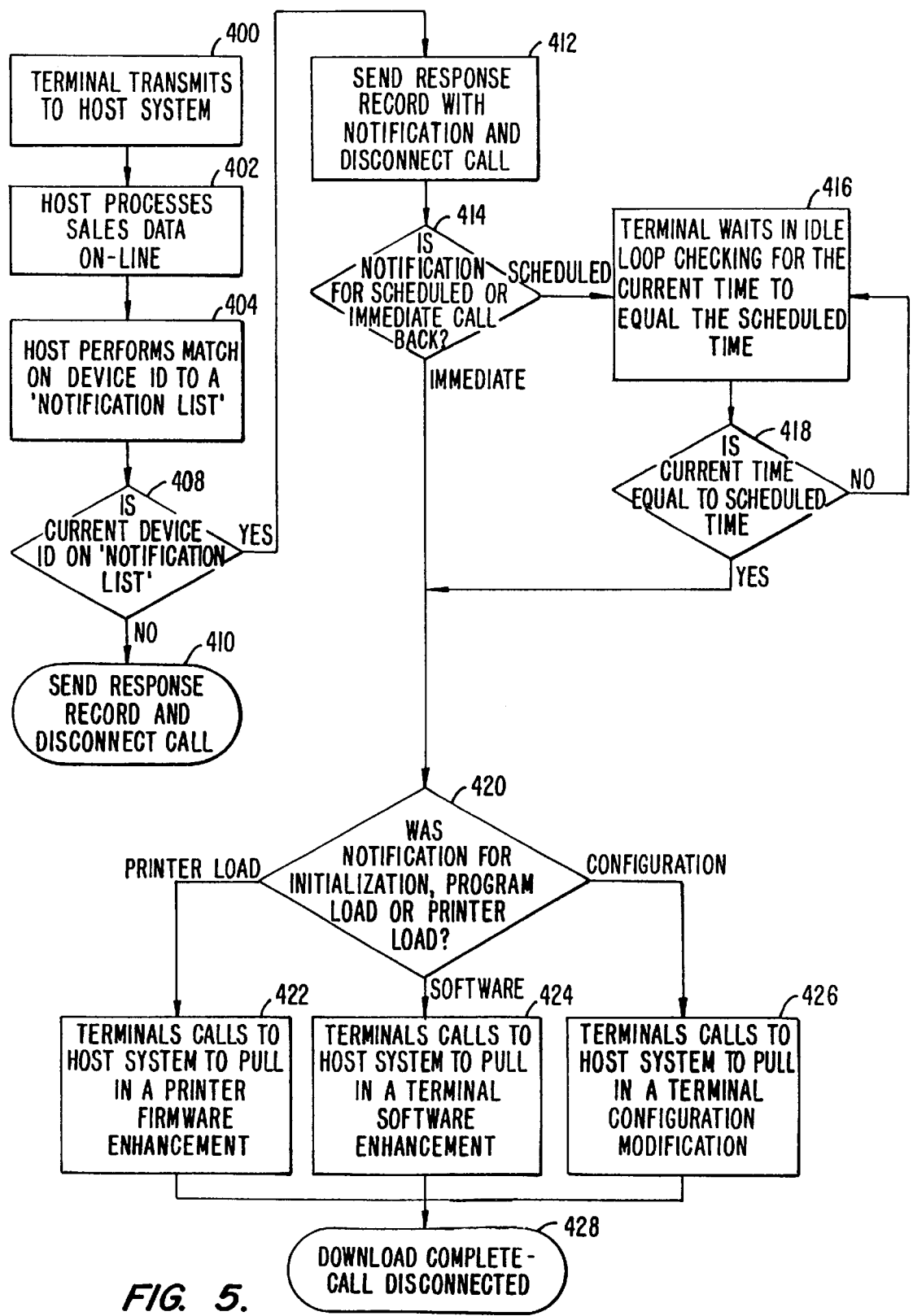
FIG. 5 is a flow chart showing an exemplary download notification and callback procedure according to the present invention.

The download notification and call back procedure is now described in connection with FIG. 5. In Step 400, the terminal transmits to the host system all of the data stored in its journal.

In Step 402, the host processes sales data on-line and, in Step 404, the host performs a match on device I.D. to a "Notification List". In Step 408, the host system determines whether the current device I.D. is on a "Notification List" and, if not, sends a recorded response in Step 410 and disconnects the call. If, in Step 408, the device I.D. is on the notification list, the system sends a recorded response in Step 412 with notification and disconnects the call. In Step 414, the terminal checks to determine whether the notification was for a scheduled or immediate callback. If the notification was for an immediate callback the system moves on to Step 420, which will be described hereafter. If the notification was for a scheduled callback, the terminal waits in an idle loop checking for the current time to equal the scheduled time in Step 416, and when the current time equals the scheduled time, moves on in Step 418 to Step 420.

In Step 420, the terminal determines the notification was for initialization, program load or printer load. If the notification was for a printer load, the terminal calls the host system in Step 422 to pull in a printer firmware enhancement and, after the download is complete, the disconnect is in Step 428.

If the terminal determines in Step 420 that the notification was for a program load, the terminal calls the host system in Step 424 and downloads a terminal software enhancement. After the download is complete, the call is disconnected in Step 428.

The notification can also be for multiple procedures (i.e., initialization and download). The notification may also be dependent on the unique code or version associated with each MOD, which is transmitted to the host system during the call.

If the terminal determines in Step 420 that the notification was for initialization, the terminal calls the host system in Step 426 and downloads a terminal configuration modification, thereafter disconnecting the call in Step 428.

A previously issued document may also be reinserted to be voided by the user. The bar code reader will verify that the appropriate document is being voided.

It should be noted that the present invention is applicable to issuing any document of value, whether or not the document is neogitable.

It should also be noted that, upon user command, a previously issued document may also be reinserted into the printer to be voided. The bar code reader will verify the serial number to make certain that the correct document is being voided.

The present invention encompasses all subject matter within the scope of the claims. Accordingly, the present invention is not limited to the preferred embodiments described above.

We claim:

1. An apparatus for issuing documents of value, comprising:
 a compartment for receiving substrates, each substrate having an associated code, wherein the codes are uniquely associated with the substrates;
 a code reader, the code reader reading the codes associated with the substrates from the substrates;
 a printer, the printer generating documents of value by printing information on the substrates; and
 a control terminal for controlling the code reader and printer, the control terminal configured for communication with the code reader and the control terminal further configured for detection and recordation of the codes uniquely associated with the substrates, wherein the control terminal detects and records deviations from an expected order of the codes uniquely associated with the substrates upon the substrates being received in the apparatus.

2. The apparatus of claim 1, wherein the documents of value comprise a money order.

3. The apparatus of claim 1, wherein the substrates comprise paper.

4. The apparatus of claim 1, wherein the codes associated with substrates are serial, and wherein the substrates are in serial order.

5. The apparatus of claim 4, further comprising means for recording which pre-serialized substrates have been printed on.

6. The apparatus of claim 1, wherein the control terminal performs a predetermined action after detecting a substrate having an improper code.

7. The apparatus of claim 6 wherein the predetermined action is voiding the substrate.

8. The apparatus of claim 6 wherein the detecting of a substrate having an improper code comprises detecting a substrate having a code that deviates from an expected order.

9. The apparatus of claim 8 wherein the control terminal further records one or more codes associated with the substrates responsive to detecting the substrate having a code that deviates from an expected order.

10. The apparatus of claim 1, wherein the codes are printed on the substrates.

11. The apparatus of claim 1, wherein the substrates are encoded using bar code.

12. The apparatus of claim 1, wherein the substrates encoding utilizes MICR.

13. The apparatus of claim 1, wherein the code reader reads codes using OCR.

14. The apparatus of claim 1, further comprising a memory, wherein the memory stores information indicating that a substrate has been read by the code reader.

15. The apparatus of claim 1, wherein the compartment comprises a lock and the lock is controlled by the control terminal.

16. The apparatus of claim 15, further comprising a printer access controller, the access controller permitting access to at least a portion of the printer upon receipt of an access code.

17. The apparatus of claim 16, wherein an access code is associated with a limited number of users.

18. The apparatus of claim 17, wherein each access code is associated with a single individual.

19. The apparatus of claim 18, further comprising a memory, wherein an access code used to obtain access to the printer is stored in the memory.

20. The apparatus of claim 19, wherein a time at which the printer is accessed is recorded in the memory.

21. The apparatus of claim 15, further comprising a memory, wherein the memory stores information indicating whether the printer has been accessed.

22. The apparatus of claim 21, wherein the memory is nonvolatile.

23. The apparatus of claim 21, wherein the memory stores information indicating a time at which the printer has been accessed.

24. The apparatus of claim 21, wherein the memory stores information indicating which access code was used to access the printer.

25. The apparatus of claim 1, further comprising means for detecting that substrates have been removed from the apparatus.

26. The apparatus of claim 25, further comprising means for detecting which substrates have been removed and when the substrates were removed.

27. The apparatus of claim 1 wherein the control terminal is further configured to detect and record deviations from an expected order of the codes uniquely associated with the substrates upon receipt of a command to issue a document of value.

28. An apparatus for issuing documents of value, comprising:

a compartment for receiving substrates, each substrate having an associated code, wherein the codes are uniquely associated with the substrates;

a code reader, the code reader reading the codes associated with the substrates from the substrates;

a printer, the printer generating documents of value by printing information on the substrates; and a control terminal for controlling the code reader and printer, the control terminal configured for communication with the code reader and the control terminal further configured for detection and recordation of the codes uniquely associated with the substrates, wherein the control terminal detects and records deviations from an expected order of the codes uniquely associated with the substrates upon the substrates being received in the apparatus, and wherein the control terminal performs a predetermined action after detecting a substrate having an improper code, and wherein the detecting of a substrate having an improper code comprises detecting a substrate having a code that is improper for a document of value of a predetermined type.

29. A method for issuing documents of value comprising:

receiving substrates, the substrates having associated codes, wherein the codes are uniquely associated with the substrates;

reading the codes from the substrates;

detecting and recording deviations from an expected order of the codes uniquely associated with the substrates before receiving a request to issue a document of value;

receiving a request to issue a document of value; and printing information on a substrate to issue a document of value.

30. The method of claim 29 wherein the step of detecting and recording deviations from an expected order occurs upon receiving the substrates.

31. The method of claim 29 further comprising:

detecting and recording deviations from an expected order of the codes uniquely associated with the substrates upon receiving a request to issue a document of value.

32. The method of claim 29 further comprising:

receiving input of an access code; and selectively permitting physical access to a portion of an apparatus implementing the method responsive to the access code.

33. A method for issuing documents of value comprising:

receiving substrates, the substrates having associated codes, wherein the codes are uniquely associated with the substrates;

reading the codes from the substrates;

detecting and recording deviations from an expected order of the codes uniquely associated with the substrates before receiving a request to issue a document of value, wherein detecting deviations from an expected order comprises detecting a substrate having a code that is improper for a document of value of a predetermined type;

receiving a request to issue a document of value; and printing information on a substrate to issue a document of value.

* * * * *

UNITED STATES PATENT AND TRADEMARK OFFICE
CERTIFICATE OF CORRECTION

PATENT NO. : 6,015,087
DATED      : January 18, 2000
INVENTOR(S) : Seifert et al.

It is certified that error appears in the above-identified patent and that said Letters Patent is hereby corrected as shown below:

On the Title Page

Please change the title from: "APPARATUS AND METHOD FOR LEASING DOCUMENTS OF VALUE"

to: --APPARATUS AND METHOD FOR ISSUING DOCUMENTS OF VALUE--

Column 1, lines 1 and 2:

Please change: "APPARATUS AND METHOD FOR LEASING DOCUMENTS OF VALUE"

to: --APPARATUS AND METHOD FOR ISSUING DOCUMENTS OF VALUE--

Signed and Sealed this

Twenty-eighth Day of November, 2000

Attest:

Q. TODD DICKINSON

*Attesting Officer*    *Director of Patents and Trademarks*